W. N. Clark,
Auger Handle.
N° 17,868.   Patented July 28, 1857.
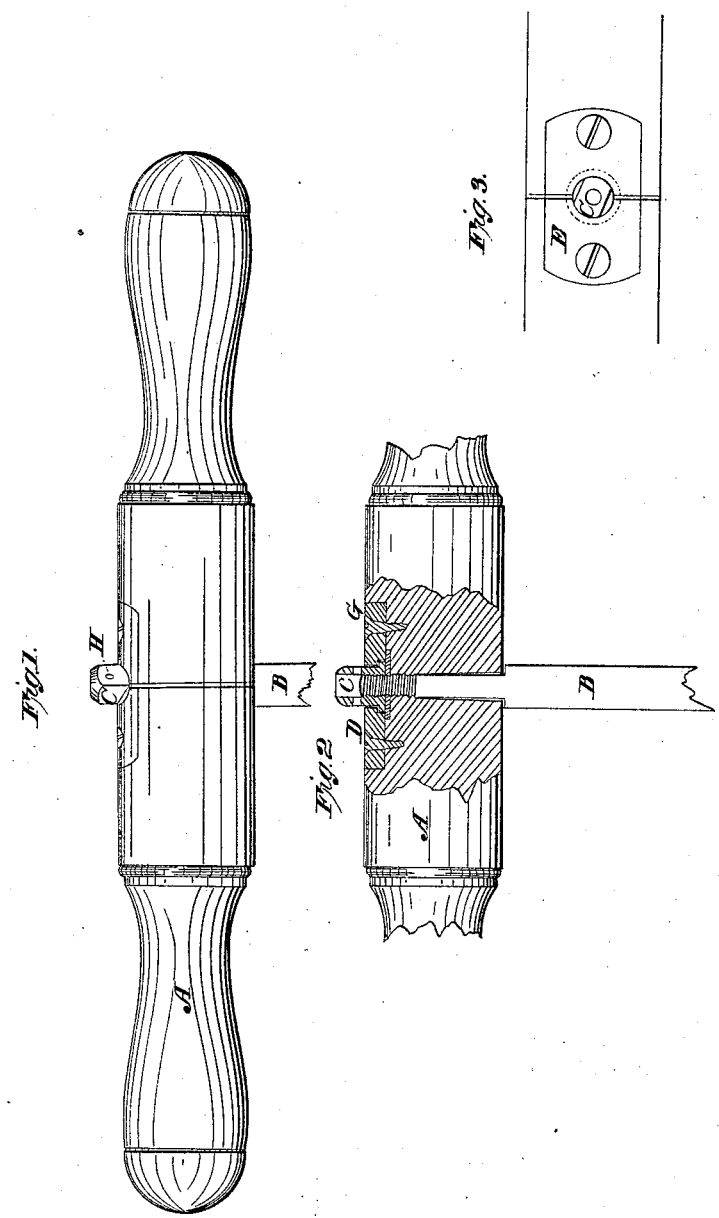

UNITED STATES PATENT OFFICE.

WILLIAM N. CLARK, OF CHESTER, CONNECTICUT.

AUGER-HANDLE FASTENING.

Specification of Letters Patent No. 17,868, dated July 28, 1857.

*To all whom it may concern:*

Be it known that I, WILLIAM NOYES CLARK, of Chester, in the county of Middlesex and State of Connecticut, have invented a new and Improved Auger-Handle; and I do hereby declare that the following is a full and exact description thereof, reference being had to the accompanying drawings and to the letters of reference marked thereon.

Various devices have been employed for fastening augers to handles but all of these devices are defective in one respect or another. When a nut has been used for fastening the auger such nut has not been connected with the handle and is consequently liable to be lost.

My invention consists of the attachment of the nut to the handle in such manner that said nut may turn freely to any extent while it is held securely in place by a nicely fitting collar not liable to become loose by wear.

In the accompanying drawings A is the handle of the auger, B, the shank of the auger, upon the upper end of which is cut a male screw which works into a corresponding female screw in nut C. The washer D, gives a proper bearing to this nut. The metallic cap E, is flat on its under side and curved above to correspond with the surface of the handle and has in the center a circular hole which fits nicely around the nut C, and by means of a countersink in the cap and a corresponding flange upon the nut the latter is held securely in place at the same time that it may turn freely.

Both the washer and the cap are let into the wood as shown in Fig. 2, and in connection with the nut are held in place by the screws G. The upper end of the nut has its sides flattened and is also perforated by the round hole H, to enable the nut to be turned. The shank of the auger is made rectangular where it is inserted in the wood, so that the shank cannot turn in the handle, while it is cylindrical at the point where it is embraced by the washer.

In order to fasten the auger to the handle it is only necessary to pass the shank into the wood until the screws meet, when, upon turning the nut the parts are all made tight and secure. In order to separate the handle the nut is turned in the opposite direction.

My auger handle may be employed with augers of different sizes, and being very durable its value is tenfold that of the handles now in use. Moreover it is very simple, and is therefore cheaply manufactured, and the most careless workman need not put it out of order.

Having thus fully described my invention, what I claim and desire to secure by Letters Patent of the United States is—

The attachment of the nut to the handle of the auger in the manner above described for the purpose of preventing the parts from being lost and to form a secure and convenient fastening as set forth.

WILLIAM N. CLARK.

Witnesses:
F. W. BUSHNELL,
JOSEPH E. SILLIMAN.